United States Patent
Wu et al.

(10) Patent No.: US 8,738,008 B2
(45) Date of Patent: May 27, 2014

(54) METHODS FOR CONTROLLING MOBILITY STATE EVALUATION OF USER EQUIPMENT AND USER EQUIPMENT THEREOF

(75) Inventors: Hao Wu, Shenzhen (CN); Yaying Wang, Shenzhen (CN); Zhongda Du, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 385 days.

(21) Appl. No.: 13/058,535

(22) PCT Filed: Aug. 12, 2009

(86) PCT No.: PCT/CN2009/073197
§ 371 (c)(1),
(2), (4) Date: Feb. 11, 2011

(87) PCT Pub. No.: WO2010/017764
PCT Pub. Date: Feb. 18, 2010

(65) Prior Publication Data
US 2011/0136522 A1 Jun. 9, 2011

(30) Foreign Application Priority Data

Aug. 12, 2008 (CN) .......................... 2008 1 0146244

(51) Int. Cl.
*H04W 36/00* (2009.01)
*H04W 72/00* (2009.01)
*H04W 40/00* (2009.01)

(52) U.S. Cl.
USPC ............ 455/442; 439/444; 439/453; 439/436

(58) Field of Classification Search
CPC .................................................. H04W 24/00
USPC ....................... 455/439, 436, 442, 452.2, 453
See application file for complete search history.

(56) References Cited

U.S. PATENT DOCUMENTS

| | | | |
|---|---|---|---|
| 6,944,448 B1 * | 9/2005 | Bobst | 455/424 |
| 7,054,631 B2 * | 5/2006 | Tee | 455/436 |
| 7,978,664 B2 * | 7/2011 | Kim | 370/338 |

(Continued)

FOREIGN PATENT DOCUMENTS

| | | |
|---|---|---|
| CN | 101207901 A | 6/2008 |
| JP | 2000092540 A | 3/2000 |

(Continued)

OTHER PUBLICATIONS

Supplementary European Search Report in European application No. 09806367.0, mailed Mar. 5, 2012.

(Continued)

*Primary Examiner* — Tilahun B Gesesse
(74) *Attorney, Agent, or Firm* — Oppedahl Patent Law Firm LLC

(57) ABSTRACT

The present invention provides methods for controlling mobility state evaluation of user equipment and user equipment thereof. The method comprises the following steps: when the user equipment receives different evaluation parameters in a process of mobility state evaluation, the user equipment explicitly defines the currently set mobility state and a method for the following mobility state evaluation so as to avoid the confusion effectively when executing evaluation. The user equipment comprises a comparing module, an evaluation controlling module and an evaluation executing module, wherein the evaluation executing module comprises of a timer, a counter, an evaluation unit and a mobility state setting unit.

8 Claims, 4 Drawing Sheets

(56) References Cited

U.S. PATENT DOCUMENTS

| | | | |
|---|---|---|---|
| 8,036,679 B1* | 10/2011 | Barbeau et al. | 455/456.1 |
| 8,145,204 B2* | 3/2012 | Saito | 455/421 |
| 8,229,434 B2* | 7/2012 | Kazmi et al. | 455/436 |
| 8,335,207 B2* | 12/2012 | Singh et al. | 370/351 |
| 2002/0049058 A1* | 4/2002 | Tee | 455/437 |
| 2009/0143093 A1* | 6/2009 | Somasundaram et al. | 455/525 |
| 2010/0120429 A1* | 5/2010 | Kazmi et al. | 455/436 |
| 2011/0026484 A1 | 2/2011 | Fox et al. | |
| 2011/0124330 A1* | 5/2011 | Kojima | 455/424 |
| 2012/0108252 A1* | 5/2012 | Dimou et al. | 455/450 |
| 2012/0295622 A1* | 11/2012 | Kazmi et al. | 455/436 |
| 2013/0084842 A1* | 4/2013 | Laitinen et al. | 455/418 |
| 2013/0115959 A1* | 5/2013 | Amirijoo et al. | 455/440 |
| 2013/0150053 A1* | 6/2013 | Hwang et al. | 455/440 |

FOREIGN PATENT DOCUMENTS

| | | | |
|---|---|---|---|
| JP | 2002190769 A | | 7/2002 |
| JP | 2010517341 A | | 5/2010 |
| JP | 2011529310 A | | 12/2011 |
| WO | 2007102479 A1 | | 9/2007 |
| WO | 2008038520 A1 | | 4/2008 |
| WO | 2008040448 A1 | | 4/2008 |
| WO | 2008040962 A1 | | 4/2008 |
| WO | 2008041573 A1 | | 4/2008 |
| WO | 2008044275 A1 | | 4/2008 |

OTHER PUBLICATIONS

Consideration on mobility state detection criteria in active mode. 3GPP TSG RAN WG2 #63, R2-083997 Aug. 18-22, 2008.
International Search Report on international application No. PCT/CN2009/073197, mailed on Nov. 19, 2009.
English Translation of the Written Opinion of the International Search Authority in international application No. PCT/CN2009/073197, mailed on Nov. 19, 2009.
Notification of the First Office Action of Chinese application No. 200810146244.5 , issued on May 25, 2011.
3GPP TSG-WG2 Meeting #62bis, R2-083288, Some editorial corrections to 36. 304, issued on Jul. 4, 2008.

* cited by examiner

METHODS FOR CONTROLLING MOBILITY STATE EVALUATION OF USER EQUIPMENT AND USER EQUIPMENT THEREOF

TECHNICAL FIELD

The present invention relates to the field of mobile communications, and in particular, to methods for controlling mobility state evaluation of user equipment and user equipment thereof.

BACKGROUND

In a mobile communication system, the speed of user equipment influences the quality of the services provided by a network, especially in the processing of cell reselection or handover, if user equipment in a high-speed motion adopts controlling parameters for a normal motion, there is a possibility that the user equipment is out of the coverage of a serving cell before the user equipment reselects or is handed over to a target cell. Thus, in the current mobile communication systems, cell reselection or handover is executed according to the controlling parameters which are dependent on a mobility state of user equipment, that is, a motion speed.

Two evaluation parameters are defined in existing mobile communication systems: T and N. T is a timer used in mobility state evaluation of user equipment, and N is a preset threshold value. In mobility state evaluation, user equipment counts the times of executing the cell reselection or handover within a time period of T, the user equipment is deemed to be in a high-speed mobility state if the counted times exceeds N times, otherwise, the user equipment is deemed to be in a normal mobility state.

However, if the user equipment enters a cell with different evaluation parameters during the process of evaluation, according to existing protocols in which evaluation parameters are broadcasted in cell system messages, the user equipment will inevitably read the new broadcast message when entering the cell and update the parameters stored in the user equipment. As the parameters different from the previous ones are obtained, the user equipment cannot determine which group of parameters should be used in the following state evaluation, and consequently confusion is caused in execution.

SUMMARY

The present invention aims to provide methods for controlling mobility state evaluation of user equipment, which solve the problem that during the process of user equipment executing mobility state evaluation, confusion is caused in the execution as evaluation parameters are changed.

In order to solve the technical problem above, the present invention provides a method for controlling mobility state evaluation of user equipment, wherein if the user equipment receives new evaluation parameters different from currently used evaluation parameters in a process of mobility state evaluation, the user equipment sets the mobility state to be a normal mobility state, updates the currently used evaluation parameters to be the new ones, and continues completing the current mobility state evaluation using the updated evaluation parameters.

Further, the method may be characterized in that:
the evaluation parameters include timing and a threshold value; and
the step that the user equipment continues completing the current mobility state evaluation using the updated evaluation parameters refers to that: the user equipment keeps current count value of a current counter and resets the timing of a timer according to updated timing, continues counting the times of the user equipment executing cell reselection or handover before the reset timing arrives, stops the timer after the reset timing arrives, evaluates the current obtained count value using an updated threshold value, and sets a corresponding mobility state according to the result of the evaluation.

Further, the method may be characterized in that:
the reset timing is the difference between the updated timing and the timing the timer has currently passed, wherein the timing the timer has currently passed is the difference between the timing before being updated and current remaining timing of the timer.

Further, the method may be characterized in that:
the timer is stopped when the updated timing is not greater than that the timer has currently completed.

In order to realize the method above, the present invention further provides a user equipment comprising a comparing module, an evaluation controlling module and an evaluation executing module, wherein
the comparing module is configured to compare received new evaluation parameters with currently used evaluation parameters, and notify the evaluation controlling module when the new evaluation parameters are different from the currently used evaluation parameters;
the evaluation controlling module is configured to notify the evaluation executing module to update evaluation parameters and reset a mobility state according to the notice from the comparing module; and
the evaluation executing module is configured to execute mobility state evaluation and reset the mobility state according to the notice from the evaluation controlling module.

Further, the user equipment may be characterized in that:
the evaluation executing module comprises a timer, a counter, an evaluation unit and a mobility state setting unit, wherein
the timer is configured to perform timing according to the timing notified by the evaluation controlling unit;
the counter is configured to count the times of the user equipment executing cell reselection or handover within the timing of the timer;
the evaluation unit is configured to evaluate the count value of the counter according to a threshold value notified by the evaluation controlling unit when the timer is stopped; and
the mobility state setting unit is configured to reset the mobility state according to the evaluation result of the evaluation unit, and set the mobility state to be a normal mobility state after receiving a mobility state reset notice from the evaluation controlling unit.

Further, the user equipment may be characterized in that:
the evaluation controlling module is configured to calculate the timing reset by the timer after receiving the notice from the comparing module, and then notify the timer of the reset timing;
the reset timing is the difference between the updated timing and the timing the timer has currently passed, wherein the timing the timer has currently passed is the difference between the timing before being updated and current remaining timing of the timer.

Further, the user equipment may be characterized in that:
the evaluation controlling module is further configured to determine whether the updated timing is greater than the timing the timer has currently passed and notify the timer to stop timing when the updated timing is not greater than the timing the timer has currently passed.

In order to solve the problem above, the present invention further provides a method for controlling mobility state evaluation of user equipment, wherein in a process of mobility state evaluation, if the user equipment receives new evaluation parameters different from those used in last mobility state evaluation, the user equipment executes next mobility state evaluation using the newly received evaluation parameters after completing current mobility state evaluation.

Further, the method may be characterized in that:

the evaluation parameters include time parameters which include trigger time and delay time; and the completion of mobility state evaluation refers to the arrival of the time timed by a timer for the trigger time, or the arrival of the time timed by the timer for the delay time.

In order to realize the method above, the present invention also provides a user equipment comprising a comparing module, an evaluation controlling module and an evaluation executing module, wherein the comparing module is configured to compare received new evaluation parameters with currently used evaluation parameters, and notify the evaluation controlling module when the new evaluation parameters are different from the currently used evaluation parameters;

the evaluation controlling module is configured to notify, after the evaluation executing module completes mobility state evaluation, the evaluation executing module to update evaluation parameters according to the notice newly received from the comparing module during the evaluation; and the evaluation executing module is configured to execute mobility state evaluation according to the notice from the evaluation controlling module.

Further, the user equipment may be characterized in that:

is the evaluation executing module comprises a timer, a counter, an evaluation unit and a mobility state setting unit, wherein the timer is configured to perform timing according to the timing notified by the evaluation controlling unit;

the counter is configured to count the times of the user equipment executing cell reselection or handover within the timing of the timer;

the evaluation unit is configured to evaluate the count value of the counter according to a threshold value notified by the evaluation controlling unit when the timer is stopped; and the mobility state setting unit is configured to reset the mobility state according to the evaluation result of the evaluation unit.

In order to solve the technical problem above, the present invention further provides a method for controlling mobility state evaluation of user equipment, wherein if the user equipment receives, in a process of mobility state evaluation, new evaluation parameters different from currently used evaluation parameters, the user equipment ends the evaluation, clears history, and re-executes mobility state evaluation using the updated evaluation parameters.

Further, the method may be characterized in that:

clearing history refers to setting the mobility state to be a normal mobility state and resetting a count value and a timer.

In order to realize the method above, the present invention further provides a user equipment comprising a comparing module, an evaluation controlling module and an evaluation executing module, wherein the comparing module is configured to compare received new evaluation parameters with currently used evaluation parameters, and notify the evaluation controlling module when the new evaluation parameters are different from the currently used evaluation parameters;

the evaluation controlling module is configured to notify the evaluation executing module to clear history and update evaluation parameters after receiving the notice from the comparing module; and the evaluation executing module is configured to execute mobility state evaluation according to the notice from the evaluation controlling module.

Further, the user equipment may be characterized in that:

the evaluation executing module comprises a timer, a counter, an evaluation unit and a mobility state setting unit, wherein the timer is configured to execute a reset according to the notice from the evaluation controlling unit and perform timing according to updated timing;

the counter is configured to execute a reset according to the notice from the evaluation controlling unit and count the times of the user equipment executing cell reselection or handover within the timing of the timer;

the evaluation unit is configured to evaluate the count value of the counter according to a threshold value notified by the evaluation controlling unit when the timer is stopped; and the mobility state setting unit is configured to reset the mobility state according to the evaluation result of the evaluation unit, and set the mobility state to be a normal mobility state after receiving a mobility state reset notice from the evaluation controlling unit.

In the methods for controlling mobility state evaluation of user equipment provided in this invention, the user equipment can effectively execute a controlling process in a process of mobility state evaluation if evaluation parameters are changed, so the confusion in execution is avoided.

DETAILED DESCRIPTION

Figure 1:
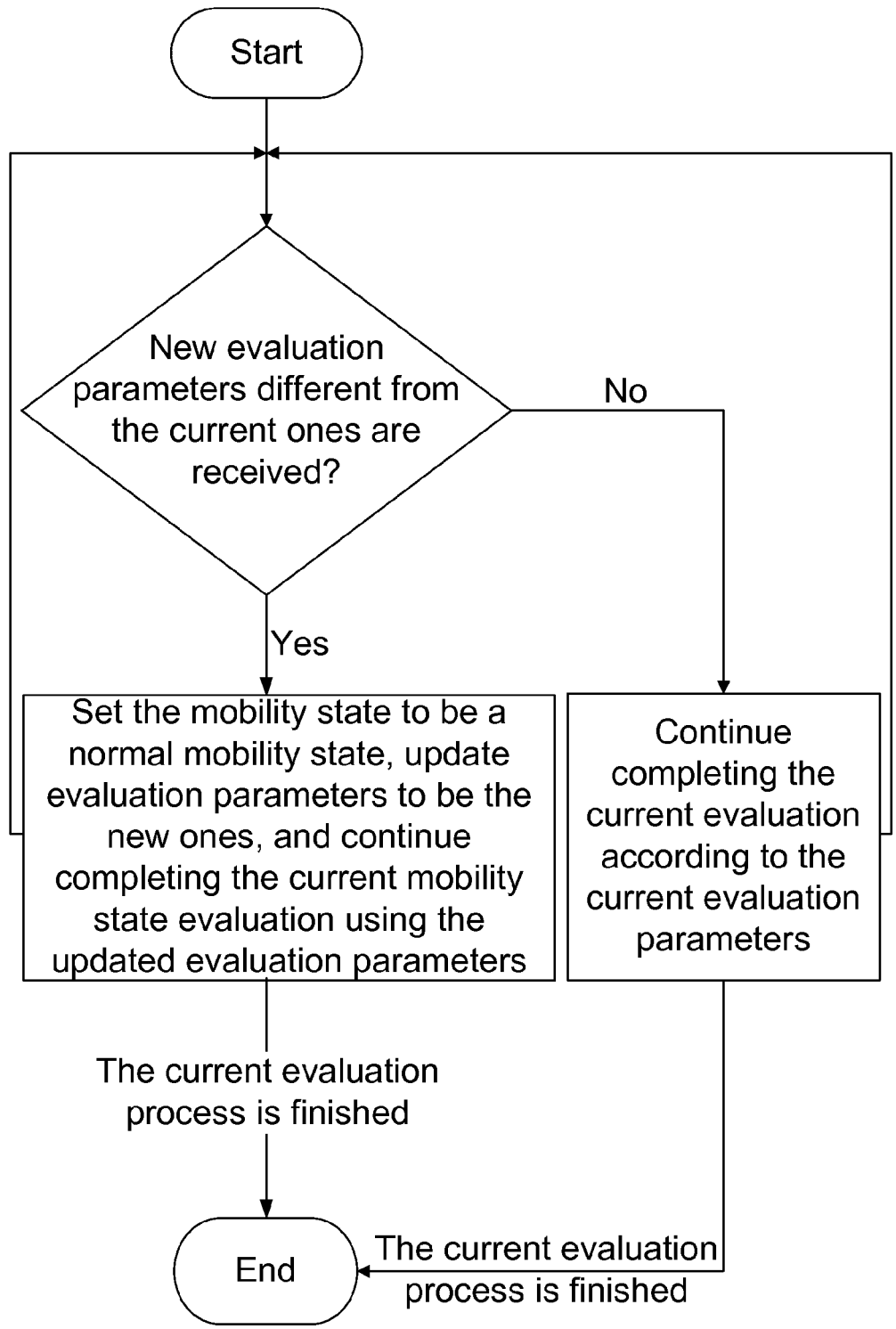
FIG. 1 is a flowchart illustrating a method for controlling mobility state evaluation of user equipment according to a first embodiment of the present invention.

The present invention provides a method for controlling mobility state evaluation of user equipment, the basic conception of which lies in that: when user equipment receives different evaluation parameters during a process of mobility state evaluation, the user equipment explicitly defines the currently set mobility state and a method for the following mobility state evaluation so as to avoid the confusion effectively when executing evaluation.

Currently, the evaluation parameters for user equipment to perform mobility state evaluation are generally included in cell system messages, and sometimes in the measurement control signaling sent from a network side, thus, the user equipment can obtain the evaluation parameters when reading the cell system messages or receiving the measurement control signaling sent from the network side. The evaluation parameters for mobility state evaluation include trigger time Tmax, delay time Thyst, a high-speed threshold value Nh and a medium-speed threshold value Nm.

However, in some cases user equipment may obtain new evaluation parameters different from the ones adopted for the current mobility state evaluation, for example, in the process of the user equipment performing mobility state evaluation, when cell reselection occurs in an idle mode, as the reselected new cell may use different evaluation parameters, the user equipment may obtain evaluation parameters different from the currently used evaluation parameters when reading the cell system messages of the new cell; or the user equipment receives the measurement control signaling sent from a network side in a connection mode, as a cell which the user equipment will be handed over to may adopt different evaluation parameters, the evaluation parameters contained in the control signaling sent from the network side may be different from the current ones; or when the user equipment controlled by the network side initiates a service and enters a connection mode from an idle mode, as in the connection mode the system may use parameters different from the ones used in the idle mode, the evaluation parameters contained in the control signaling sent from the network side may be different from the current ones; or when the user equipment ends a service and enters an idle mode from a connection mode, as in the idle mode the network may use parameters different from the ones used in the connection mode, the evaluation parameters contained in the cell information read by the user equipment in the idle mode may be different from the current ones. Under these conditions, the user equipment is required to define the current mobility state and a method for the following mobility state evaluation explicitly so that the user equipment can explicitly execute the following mobility state evaluation.

The First Embodiment

When user equipment receives new evaluation parameters different from the current ones, handover occurs between different modes; especially when handover occurs from an idle mode to a connection mode, as in different modes the parameters configured by a network side for a cell are generally much different and the user equipment has a relatively high requirement on the quality of services in the connection mode, the current evaluation parameters have little meaning for reference in the following mobility state evaluation. Considering the situation above, preferably, the embodiment of the present invention recommends, but is not limited to continue completing the current mobility state evaluation using the new evaluation parameters once the new evaluation parameters are received.

Referring to FIG. 1, if handover between different modes occurs when user equipment receives new evaluation parameters different from the current ones, the user equipment sets the current mobility state to be a normal mobility state, keeps the current count value of a counter, updates evaluation parameters to be the new ones, and continues completing the current mobility state evaluation using the updated evaluation parameters.

Considering the situation that the parameters configured by the network side for a cell are generally much different after mode handover, the current mobility state set by the user equipment may not be suitable for the mode after handover any more, thus the user equipment sets the mobility state to be a normal mobility state.

Considering the situation that the current mobility state evaluation has not been completed when the new evaluation parameters are received, the currently finished evaluation is taken as one part of the mobility state evaluation and still has certain meaning for reference, thus, the finished evaluation is kept, that is, the current count value of the counter is kept; the evaluation parameters are updated to be the new ones, the timing of a timer is reset to be the difference between an updated timing and the timing the timer has currently passed, the timing the timer has currently passed is the difference between the timing before being updated and the current remaining timing of the timer, the counting for the times of the user equipment executing cell reselection or handover is continued before the reset timing arrives, the timer is stopped after the reset timing arrives, the obtained count value is evaluated using an updated threshold value, and a corresponding mobility state is set according to the result of the evaluation. As the timer may be timing for trigger time or delay time when the new evaluation parameters are received, the following two cases should be considered respectively:

Case 1

Assuming that the timer is timing for the trigger time Tmax1 when the user equipment receives the new evaluation parameters (trigger time Tmax2, delay time Thyst2, a high-speed threshold value Nh2, and a medium-speed threshold value Nm2), the current remaining timing of the timer is x, and the current count value of the counter is y, then the timing of the timer is reset to be the difference between the updated timing Tmax2 and the timing the timer has currently passed, the timing the timer has currently passed is the difference between the timing Tmax1 before being updated and the current remaining timing x of the timer, the evaluation parameters are updated, and the subsequent evaluation of the current mobility state evaluation is executed according to the updated evaluation parameters. Preferably, before the timing of the timer is reset, it is determined whether the updated trigger time Tmax2 is greater than the timing the timer has currently passed, if the result of the determination is that the updated trigger time Tmax2 is not greater than the timing the timer has currently passed, the timer is stopped, the updated high-speed threshold value Nh2 and the medium-speed threshold value Nm2 are adopted to evaluate the current count value y of the counter; specifically, the mobility state of the user equipment is determined to be medium speed when the count value y of the counter is greater than or equal to the medium-speed threshold value Nm2 but smaller than the high-speed threshold value Nh2, or the mobility state of the user equipment is determined to be high speed when the count value y of the counter is greater than or equal to the high-speed threshold value Nh2, or the mobility state of the user equipment is determined to be normal when the count value y of the counter is smaller than the medium-speed threshold value Nm2, and then the mobility state of the user equipment is reset according to the result of the evaluation. If the result of the determination is that the updated trigger time Tmax2 is greater than the timing the timer has currently passed, the counting for the times of the user equipment executing cell reselection or handover is continued before the reset timing arrives, the timer is stopped when the reset timing arrives, and the updated high-speed threshold value Nh2 and the medium-speed threshold value Nm2 are adopted to evaluate the count value of the counter, and a corresponding mobility state is set according to the result of the evaluation.

Case 2

Assuming that the timer is timing for the delay time Thyst1 when the user equipment receives the new evaluation parameters (trigger time Tmax2, delay time Thyst2, a high-speed threshold value Nh2, and a medium-speed threshold value Nm2), the current remaining timing of the timer is x, and the current count value of the counter is y, then by using the method above the timing of the timer is reset to be the difference between the updated delay time Thyst2 and the timing the timer has currently passed, the timing the timer has currently passed is the difference between the delay time Thyst1 before being updated and the current remaining timing x of the timer, the evaluation parameters are updated, and the subsequent evaluation of the current mobility state evaluation is executed according to the updated evaluation parameters. The timer is stopped when the reset timing arrives, the updated high-speed threshold value Nh2 and the medium-speed threshold value Nm2 are adopted to evaluate the count value of the counter, and a corresponding mobility state is set according to the result of the evaluation. Preferably, before the timing is reset, it is determined whether the updated delay time Thyst2 is greater than the delay time the timer has currently passed, if the result of the determination is that the updated delay time Thyst2 is not greater than the delay time the timer has currently passed, the timer is stopped; otherwise, the timing of the timer is reset according to the method above to continue the evaluation within the reset timing.

Figure 2:
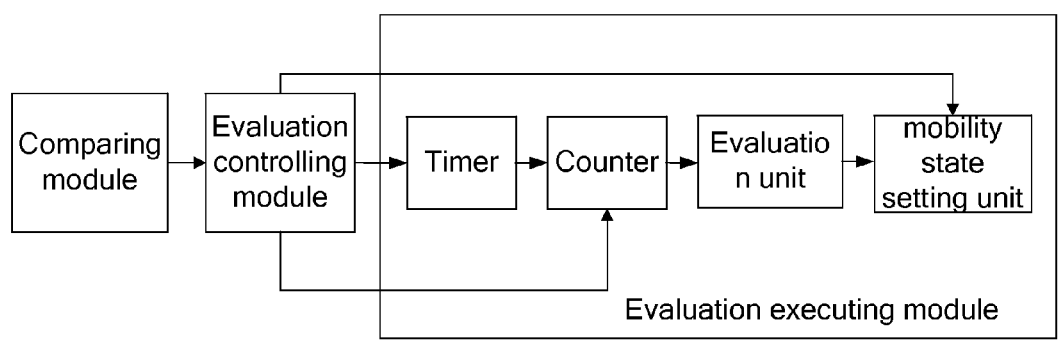
FIG. 2 is a structural diagram illustrating user equipment capable of controlling mobility state evaluation of user equipment according to a first embodiment of the present invention.

In order to realize the method above, the present invention further provides a user equipment, referring to FIG. 2, the user equipment comprises a comparing module, an evaluation controlling module and an evaluation executing module, wherein the comparing module is configured to compare received new evaluation parameters with currently used evaluation parameters, and notify the evaluation controlling module when the new evaluation parameters are different from the currently used evaluation parameters;

the evaluation controlling module calculates, after receiving the notice from the comparing module, timing reset for a timer according to the notice, and then notifies the timer of the reset timing and notifies the evaluation executing module to update evaluation parameters and reset a mobility state; wherein the reset timing is the difference between the updated timing and the timing the timer has currently passed, wherein the timing the timer has currently passed is the difference between the timing before being updated and the current remaining timing of the timer. Preferably, the evaluation controlling module further determines whether the updated timing is greater than the timing the timer has currently passed, and notifies the timer to stop timing when the result is that the updated timing is not greater than the timing the timer has currently passed;

the evaluation executing module executes mobility state evaluation according to the notice from the evaluation controlling module, and resets the mobility state. Further, the evaluation executing module comprises an evaluation unit, a timer, a counter, and a mobility state setting unit, wherein the timer performs timing according to the timing notified by the evaluation controlling unit; the counter counts the times of the user equipment executing cell reselection or handover within the timing of the timer; the evaluation unit evaluates the count value of the counter according to a threshold value notified by the evaluation controlling unit when the timer is stopped; and the mobility state setting unit resets the mobility state according to the evaluation result of the evaluation unit and sets the mobility state to be a normal mobility state after receiving a mobility state reset notice from the evaluation controlling unit.

The method described in this embodiment is suitable for the case where mode handover occurs when user equipment receives new evaluation parameters different from the current ones, and meets the relatively high requirement of the user equipment on the accuracy of state evaluation during mode handover.

The Second Embodiment

If no handover occurs between different modes when user equipment receives new evaluation parameters different from the current ones, as in the same mode the parameters configured by a network side for a cell are generally little different, the currently set mobility state and the current evaluation parameters have certain meaning for reference in the following mobility state evaluation. Considering the situation above, preferably, the embodiment of the present invention recommends but is not limited to continue completing the current mobility state evaluation using the current evaluation parameters after receiving the new evaluation parameters, instead of immediately updating the evaluation parameters.

Figure 3:
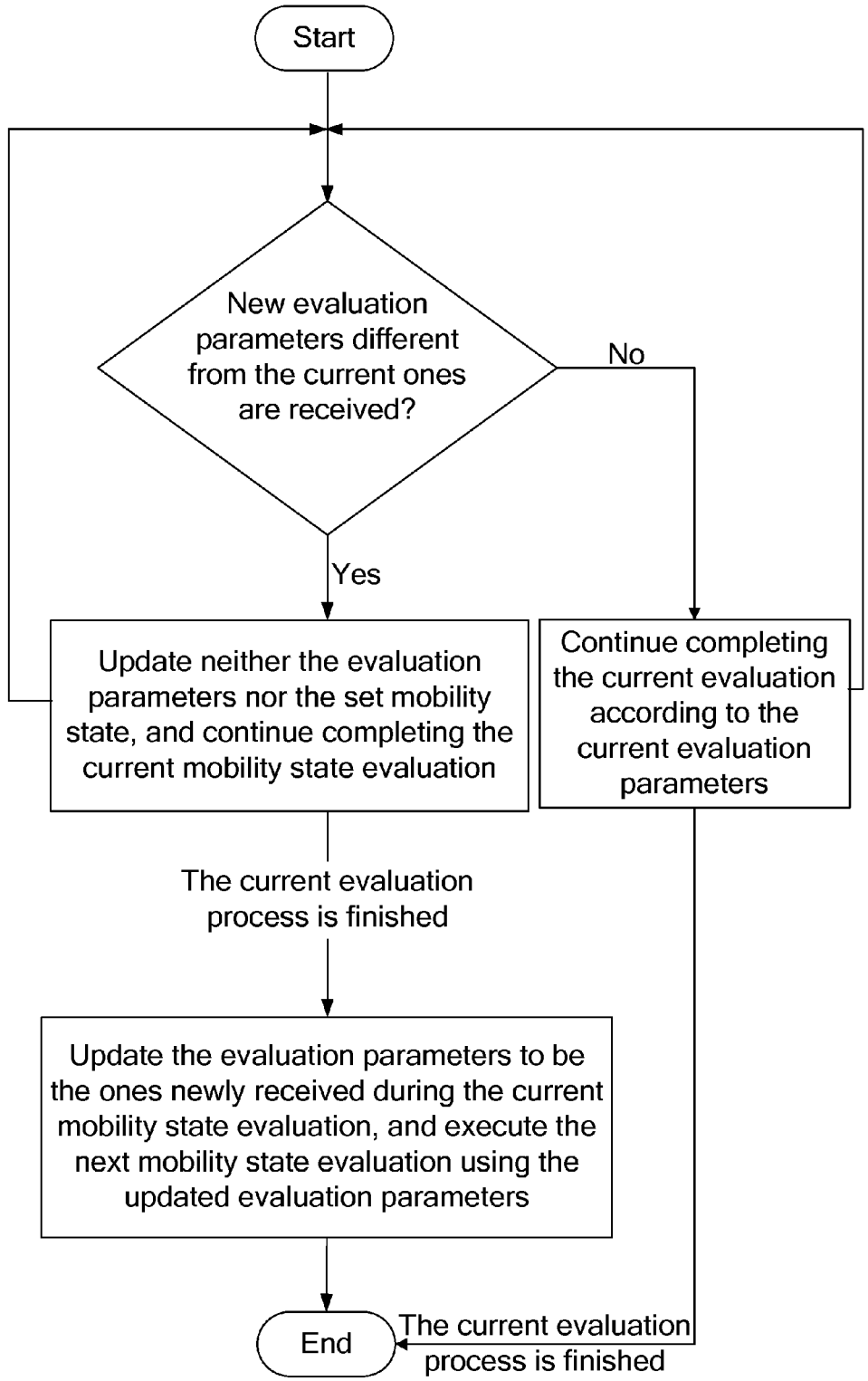
FIG. 3 is a flowchart illustrating a method for controlling mobility state evaluation of user equipment according to a second embodiment of the present invention.

Referring to FIG. 3, if no handover occurs between different modes when the user equipment receives new evaluation parameters different from the current ones, the user equipment keeps the currently set mobility state, the current count value of a counter and the remaining timing of a timer, updates no evaluation parameters, and continues completing the current mobility state evaluation using the current evaluation parameters.

Considering in the same mode the parameters configured by a network side for a cell are generally little different and the current mobility state of the user equipment still has certain meaning for reference, the user equipment can continue keeping the currently set mobility state.

Assuming that the evaluation parameters for the user equipment to perform the current mobility state evaluation are as follows: trigger time Tmax1, delay time Thyst1, a high-speed threshold value Nh1, and a medium-speed threshold value Nm1. In complete mobility state evaluation, the user equipment activates a timer after mobility state evaluation is triggered, the timing is Tmax1, a counter can be used before the trigger time arrives to count the times of the user equipment executing cell reselection or handover; the timer is stopped when the trigger time arrives, the high speed-threshold value Nh1 and the medium-speed threshold value Nm1 are used to evaluate the count value of the counter; specifically, the user equipment is determined to be in a medium-speed mobility state when the count value of the counter is greater than or equal to the medium-speed threshold value Nm1 but smaller than the high-speed threshold value Nh1, the user equipment is determined to be in a high-speed mobility state when the count value of the counter is greater than or equal to the high-speed threshold value Nh1, and the user equipment is determined to be in a normal mobility state when the count value of the counter is smaller than the medium-speed threshold value Nm1. It should be noted here that: if the mobility state currently kept by the user equipment is a normal state, a corresponding mobility state is set according to the result of the evaluation; otherwise, a corresponding mobility state is set according to the result of the evaluation when the result of the evaluation is medium speed or high speed, however, when the result of the evaluation is normal, the user equipment reactivates the timer to set timing to be Thyst1, continues counting the times of the user equipment executing cell reselection or handover within the delay time Thyst1, evaluates the sum of the count values obtained within the time Tmax1 and the time Thyst1 when the delay time Thyst1 arrives, and sets a corresponding mobility state according to the result of the evaluation.

There is no influence on the current evaluation if the user equipment receives new evaluation parameters different from the current ones during the evaluation process.

After the current evaluation is completed, the evaluation parameters are updated to be the ones which are newly received before the current mobility state evaluation is completed, and next mobility state evaluation is executed using the updated evaluation parameters.

In order to realize the method above, the present invention further provides a user equipment, referring to FIG. 2, the user equipment comprises a comparing module, an evaluation controlling module and an evaluation executing module, wherein the comparing module is configured to compare received new evaluation parameters with the currently used evaluation parameters, and notify the evaluation controlling module when the new evaluation parameters are different from the currently used evaluation parameters;

the evaluation controlling module notifies, after the evaluation executing module completes evaluation, the evaluation executing module to update the evaluation parameters according to the notice newly received from the comparing module during the evaluation; and the evaluation executing module executes mobility state evaluation according to the notice from the evaluation controlling module. Further, the evaluation executing module comprises an evaluation unit, a timer, a counter, and a mobility state setting unit, wherein the timer performs timing according to the timing notified by the evaluation controlling unit; the counter counts the times of the user equipment executing cell reselection or handover within the timing of the timer; the evaluation unit evaluates the count value of the counter according to a threshold value notified by the evaluation controlling unit when the timer is stopped; and the mobility state setting unit resets the mobility state according to the evaluation result of the evaluation unit.

The method described in this embodiment is suitable for the case where no mode handover occurs when user equipment receives new evaluation parameters different from the current ones, and fully considers the situation that the parameters configured by a network side for a cell are little different in the same mode and the mobility state of the user equipment has great meaning for reference in mobility state evaluation.

The Third Embodiment

This embodiment further provides a universal processing method, which is easy to implement.

Figure 4:
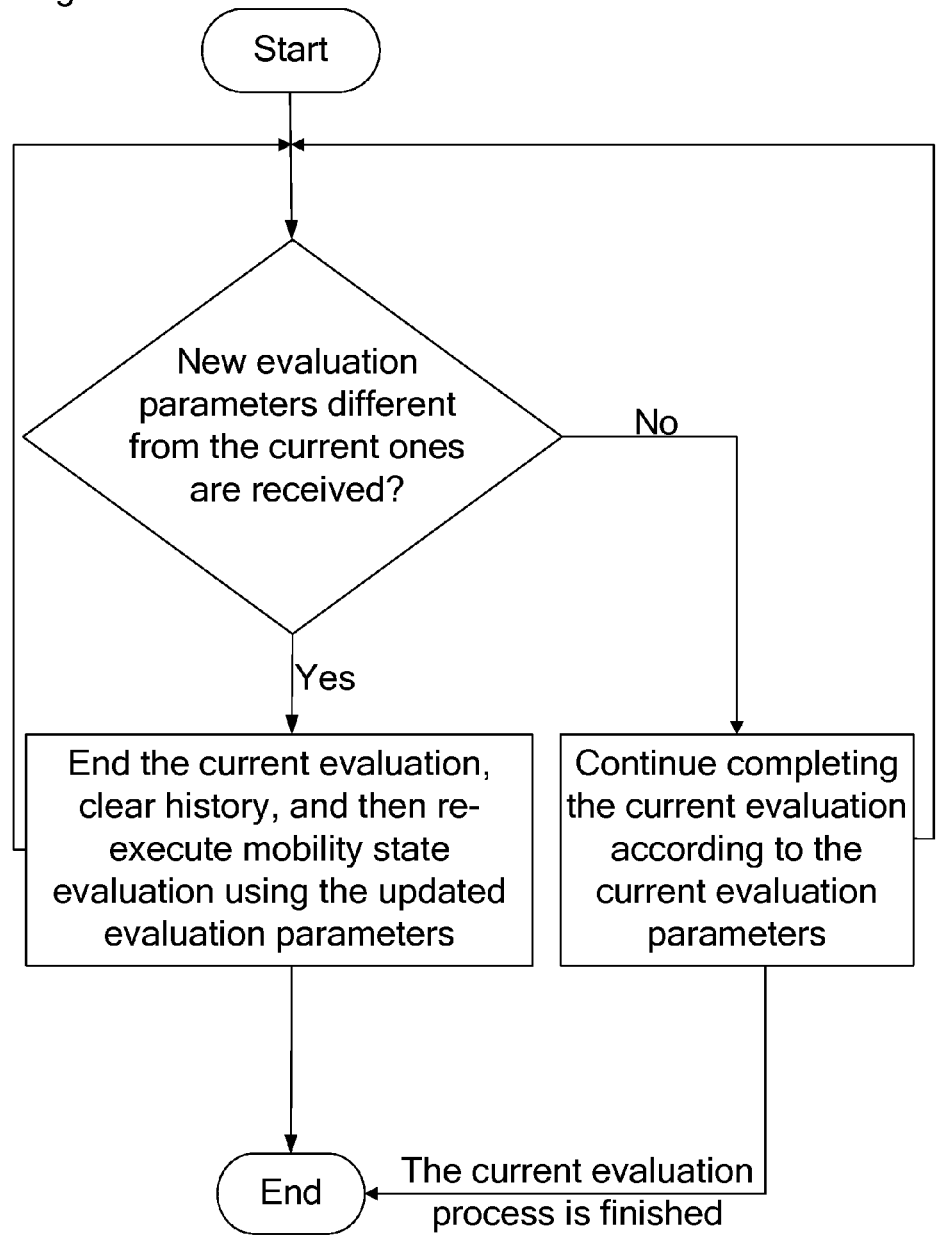
FIG. 4 is a flowchart illustrating a method for controlling mobility state evaluation of user equipment according to a third embodiment of the present invention.

Referring to FIG. 4, if user equipment receives new evaluation parameters different from currently used evaluation parameters in a process of mobility state evaluation, the current mobility state of the user equipment may not be considered, the history of the mobility state evaluation of the user equipment is cleared, that is, the mobility state is set to be a normal mobility state, a count value and a timer are reset, and the current mobility state evaluation is ended; and then, evaluation parameters are updated to be the new ones received, and mobility state evaluation using the updated evaluation parameters is re-executed. Wherein the method for re-executing mobility state evaluation using the new evaluation parameters is the same as that described in the second embodiment, so no more description is given here.

In order to realize the method above, the present invention further provides a user equipment, referring to FIG. 2, the user equipment comprises a comparing module, an evaluation controlling module and an evaluation executing module, wherein the comparing module is configured to compare received new evaluation parameters with the currently used evaluation parameters, and notify the evaluation controlling module when the new evaluation parameters are different from the currently used evaluation parameters;

the evaluation controlling module notifies the evaluation executing module to clear history and update the evaluation parameters after receiving the notice from the comparing module; and the evaluation executing module executes mobility state evaluation according to the notice from the evaluation controlling module. Further, the evaluation executing module comprises an evaluation unit, a timer, a counter, and a mobility state setting unit, wherein the timer is reset according to the notice from the evaluation controlling unit and performs timing according to updated timing; the counter is reset according to the notice from the evaluation controlling unit and counts the times of the user equipment executing cell reselection or handover within the timing of the timer; the evaluation unit evaluates the count value of the counter according to a threshold value notified by the evaluation controlling unit when the timer is stopped; and the mobility state setting unit resets the mobility state according to the evaluation result of the evaluation unit, and sets the mobility state to be a normal mobility state after receiving a mobility state reset notice from the evaluation controlling unit.

Of course, the present invention may have many other embodiments, various modifications and variations can be devised by those skilled in this art without departing from the spirit and the scope of the present invention, and it should be understood that these modifications and variations belong to the protection scope of the claims appended in this invention.

INDUSTRIAL APPLICABILITY

In the methods for controlling mobility state evaluation of user equipment provided in this invention, the user equipment explicitly defines the currently set mobility state and the method for the following mobility state evaluation when receiving different evaluation parameters during the process of mobility state evaluation so as to avoid the confusion effectively when executing evaluation.

The invention claimed is:

1. A user equipment, comprising: a processor for implementing a comparing module, an evaluation controlling module and an evaluation executing module, wherein the comparing module is configured to compare received new evaluation parameters with currently used evaluation parameters, and notify the evaluation controlling module when the new evaluation parameters are different from the currently used evaluation parameters;

the evaluation controlling module is configured to notify the evaluation executing module to update evaluation parameters and reset a mobility state of the user equipment according to the notice from the comparing module; and the evaluation executing module is configured to update the evaluation parameters, execute mobility state evaluation and reset the mobility state of the user equipment according to the notice from the evaluation controlling module;

wherein the user equipment is configured to perform mobility state evaluation, using evaluation parameters; and when the user equipment receives from a base station new evaluation parameters different from the currently used evaluation parameters during a round of mobility state evaluation, the user equipment performs the following:

setting the mobility state to be a normal mobility state, updating the currently used evaluation parameters with the new evaluation parameters, and continuing to perform the current round of mobility state evaluation using the updated evaluation parameters.

2. The user equipment according to claim 1, wherein the evaluation executing module comprises a timer, a counter, an evaluation unit and a mobility state setting unit, wherein the timer is configured to perform timing according to the timing notified by the evaluation controlling module;

the counter is configured to count the times of the user equipment executing cell reselection or handover within the timing of the timer;

the evaluation unit is configured to evaluate the count value of the counter according to a threshold value notified by the evaluation controlling module when the timer is stopped; and the mobility state setting unit is configured to reset the mobility state of the user equipment according to the evaluation result of the evaluation unit, and set the mobility state of the user equipment to be a normal mobility state after receiving a mobility state reset notice from the evaluation controlling module.

3. The user equipment according to claim 2, wherein the evaluation controlling module is further configured to calculate the timing reset by the timer after receiving the notice from the comparing module, and then notify the timer of the reset timing, wherein the reset timing is the difference between the updated timing and the timing the timer has currently passed, wherein the timing the timer has currently passed is the difference between the timing before being updated and current remaining timing of the timer.

4. The user equipment according to claim 2, wherein the evaluation controlling module is further configured to determine whether the updated timing is greater than the timing the timer has currently passed, and notify the timer to stop timing when the updated timing is not greater than the timing the timer has currently passed.

5. A user equipment for, comprising: a processor for implementing a comparing module, an evaluation controlling module and an evaluation executing module, wherein the comparing module is configured to compare received new evaluation parameters with currently used evaluation parameters, and notify the evaluation controlling module when the new evaluation parameters are different from the currently used evaluation parameters;

the evaluation controlling module is configured to notify, after the evaluation executing module completes mobility state evaluation, the evaluation executing module to update evaluation parameters according to the notice newly received from the comparing module during the mobility state evaluation; and the evaluation executing module is configured to update the evaluation parameters and execute mobility state evaluation according to the notice from the evaluation controlling module, wherein the user equipment is configured to perform mobility state evaluation, using evaluation parameters; and when the user equipment receives from a base station new evaluation parameters different from the currently used evaluation parameters during a round of mobility state evaluation, the user equipment performs the following:

continuing to perform the current round of mobility state evaluation, by the user equipment, using the currently used evaluation parameters; and performing, by the user equipment, a next round of mobility state evaluation using the new evaluation parameters after completing the current round of mobility state evaluation.

6. The user equipment according to claim 5, wherein the evaluation executing module comprises a timer, a counter, an evaluation unit and a mobility state setting unit, wherein the timer is configured to perform timing according to the timing notified by the evaluation controlling module;

the counter is configured to count the times of the user equipment executing cell reselection or handover within the timing of the timer;

the evaluation unit is configured to evaluate the count value of the counter according to a threshold value notified by the evaluation controlling module when the timer is stopped; and the mobility state setting unit is configured to reset the mobility state of the user equipment according to the evaluation result of the evaluation unit.

7. A user equipment for, comprising: a processor for implementing a comparing module, an evaluation controlling module and an evaluation executing module, wherein the comparing module is configured to compare received new evaluation parameters with currently used evaluation parameters, and notify the evaluation controlling module when the new evaluation parameters are different from the currently used evaluation parameters;

the evaluation controlling module is configured to notify the evaluation executing module to clear history and update evaluation parameters after receiving the notice from the comparing module; and the evaluation executing module is configured to update the evaluation parameters and execute mobility state evaluation according to the notice from the evaluation controlling module, the user equipment is configured to perform mobility state evaluation, using evaluation parameters;

when the user equipment receives from a base station new evaluation parameters different from the currently used evaluation parameters during a round of mobility state evaluation, the user equipment performs the following:

ending the current round of mobility state evaluation, clearing history, updating the currently used evaluation parameters with the new evaluation parameters, and re-performing the current round of mobility state evaluation using the updated evaluation parameters.

8. The user equipment according to claim 7, wherein the evaluation executing module comprises a timer, a counter, an evaluation unit and a mobility state setting unit, wherein the timer is configured to execute a reset according to the notice from the evaluation controlling module and perform timing according to updated timing;

the counter is configured to execute a reset according to the notice from the evaluation controlling module and count the times of the user equipment executing cell reselection or handover within the timing of the timer;

the evaluation unit is configured to evaluate the count value of the counter according to a threshold value notified by the evaluation controlling module when the timer is stopped; and the mobility state setting unit is configured to reset the mobility state of the user equipment according to the evaluation result of the evaluation unit, and set the mobility state of the user equipment to be a normal mobility state after receiving a mobility state reset notice from the evaluation controlling module.

* * * * *